No. 665,065. Patented Jan. 1, 1901.
W. R. COOK.
FUSE HOLDER.
(Application filed Apr. 18, 1900.)

(No Model.) 2 Sheets—Sheet 1.

WITNESSES:
H. G. Dieterich
C. R. Ferguson

INVENTOR
Warren R. Cook
BY
ATTORNEYS

No. 665,065. Patented Jan. 1, 1901.
W. R. COOK.
FUSE HOLDER.
(Application filed Apr. 18, 1900.)
(No Model.) 2 Sheets—Sheet 2.
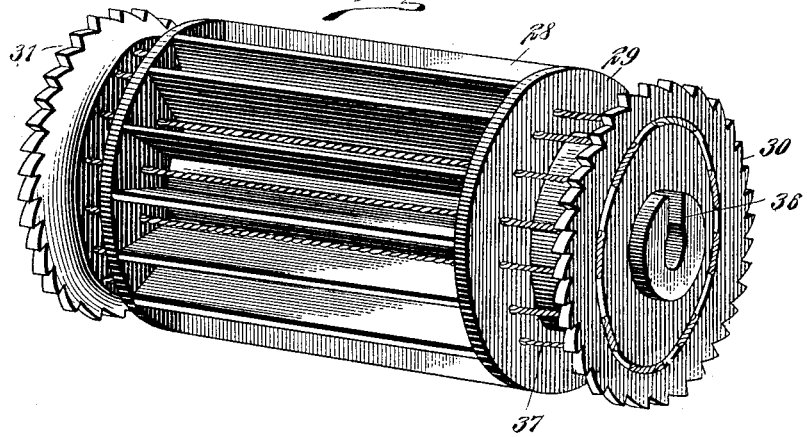
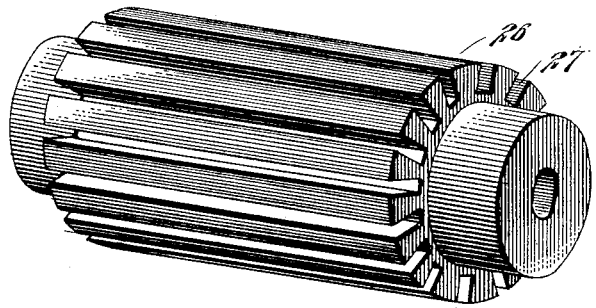
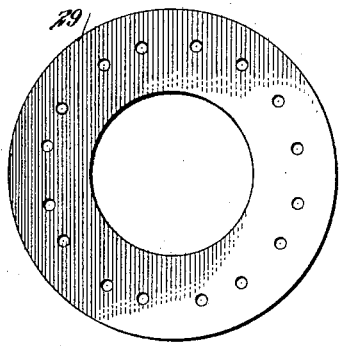
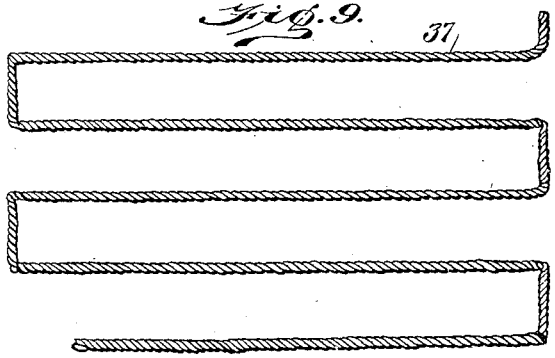
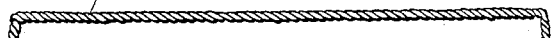
WITNESSES:
H. S. Dieterich
C. R. Ferguson
INVENTOR
Warren R. Cook.
BY 
ATTORNEYS

UNITED STATES PATENT OFFICE.

WARREN RANKIN COOK, OF PITTSBURG, PENNSYLVANIA.

FUSE-HOLDER.

SPECIFICATION forming part of Letters Patent No. 665,065, dated January 1, 1901.

Application filed April 18, 1900. Serial No. 13,338. (No model.)

*To all whom it may concern:*

Be it known that I, WARREN RANKIN COOK, a citizen of the United States, and a resident of Pittsburg, in the county of Allegheny and State of Pennsylvania, have invented a new and Improved Fuse-Holder, of which the following is a full, clear, and exact description.

This invention relates to improvements in fuse-wire holders particularly adapted for use in electrically-operated street-cars; and the object is to provide a holder of simple construction adapted to contain a plurality of fuse-wires, so that should one be burned out another may be quickly turned into place to complete the circuit.

I will describe a fuse-holder embodying my invention and then point out the novel features in the appended claims.

Reference is to be had to the accompanying drawings, forming a part of this specification, in which similar characters of reference indicate corresponding parts in all the figures.

Figure 1:
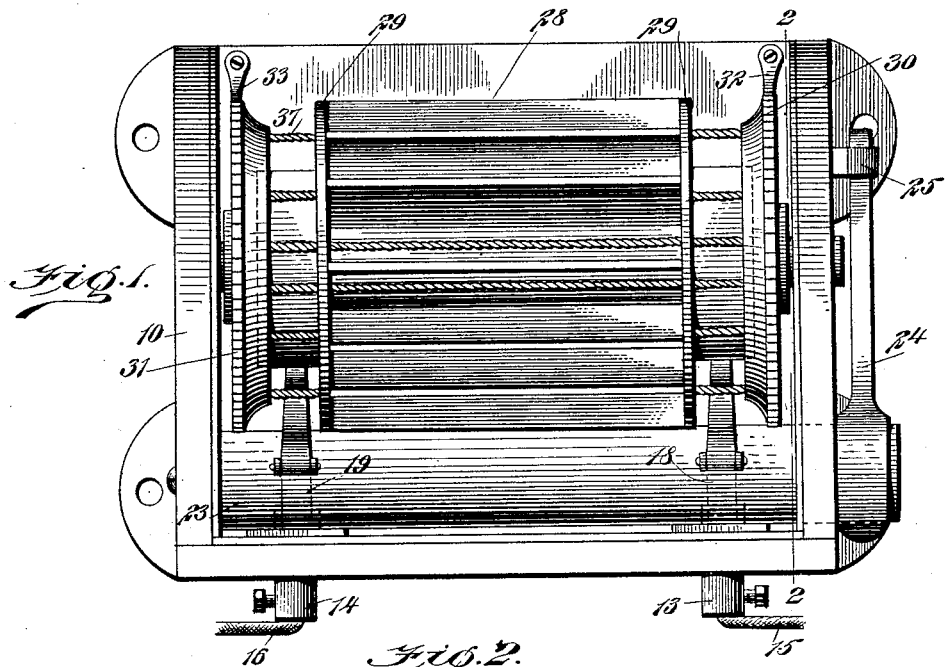
Figure 2:
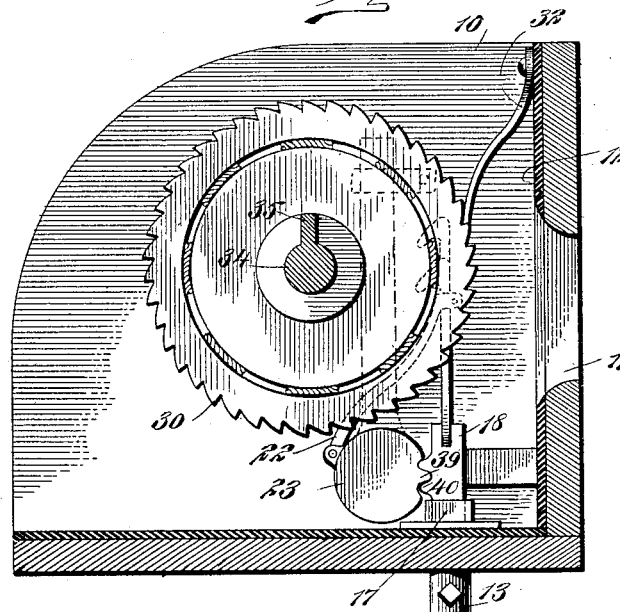
Figure 5:
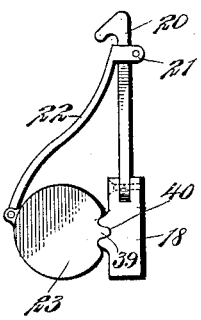
Figure 6:
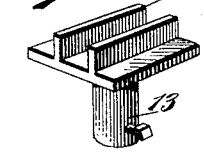
Figure 7:
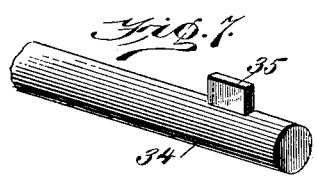

Figure 1 is an elevation of a fuse-holder embodying my invention. Fig. 2 is a section on the line 2 2 of Fig. 1. Fig. 3 is a perspective view of the holder removed from the casing. Fig. 4 is a perspective view of the body portion of the holder or cylinder. Fig. 5 shows a circuit-closing device employed. Fig. 6 shows another portion of the circuit-closer. Fig. 7 is a perspective view of a portion of the holder-shaft. Fig. 8 shows one of the end plates employed. Fig. 9 shows a fuse-wire. Fig. 10 shows a modification of the fuse-wire, and Fig. 11 is a perspective view of one of the separating-strips employed.

Referring to the drawings, 10 designates a casing of any suitable material—such, for instance, as wood—and having an opening 11 in its vertical wall, whereby a current of air may pass through the casing to keep the fuse-wires practically cool. The casing will preferably be lined with slate 12 or other suitable insulating material. Extended through the bottom wall of the casing are binding-posts 13 and 14 to receive the ends of the lead-wires 15 and 16. The inner ends of the posts 13 and 14 are provided with upwardly-extended contact-plates 17, the said contact-plates being spaced apart to receive contact-blocks 18 and 19, designed to be placed in electrical connection with the fuse-wire by means of clamping-hooks 20, as will be hereinafter described.

Mounted to slide on the shank portions of the clamping-hooks 20 are clamping-jaws 21, attached to arms 22, having pivotal connection with a rocking device or cylinder 23, consisting of any suitable insulated material, and one end of this rocking cylinder extends through an end wall of the casing and is provided with an operating-handle 24, held normally in its upright position by means of a spring-latch 25, arranged on the end of the casing.

The rotary carrier for the fuse-wires, consisting of a cylindrical body portion 26, of any suitable material, is provided with longitudinal channels 27 to receive the inner edges of separating-plates 28, consisting, preferably, of slate. These separating-plates 28 project laterally, forming side walls of chambers in which the fuse-wires are stretched. The separating-plates will prevent the passing of a spark or heat from a melting or burning fuse to the next fuse-wire.

Mounted on the cylinder and engaging against the ends of the plates 28 are rings 29, consisting of slate or other suitable insulating material, and attached to each end of the body portion 26 of the carrier are ratchet-wheels 30 31, adapted to be engaged by spring-pawls 32 33 to prevent a backward movement of the carrier. While I have shown two ratchet-wheels, it is obvious that one may be omitted without departing from the spirit of my invention. The carrier is mounted on a removable shaft 34, having bearings in the end walls of the casing. To cause the carrier to rotate with the shaft, I provide the shaft with a lug 35, adapted to engage in a notch or slot 36, arranged in the hub portion of the ratchet-wheel 30. The end wall of the casing through which the end of the shaft 34 having the lug 35 passes will be provided with a slot or opening through which the said lug may be passed. When the shaft is pushed inward, seating the lug 35 in the opening 36, it is obvious that the carrier will rotate with the shaft and the shaft cannot be removed until the carrier shall have made a complete rotation, bringing the opening 36 in line with the opening through the end wall of the casing. Then the shaft may be drawn outward, after which the carrier may be easily removed for the purpose of supplying it with new fuse-wire.

Preferably I may employ the fuse-wire 37, consisting of a single length of wire rove back and forth through perforations in the end pieces 29 and the ratchet-wheels 30 and 31, as plainly indicated in Fig. 3 and in which the stretches of the fuse-wire are shown in the chambers of the carrier. I may, however, instead of a single length of wire rove in the manner described use single lengths of wire 38.

The rocking part 23 is provided with a pawl 39 to engage in notches 40, formed in the blocks 18 and 19, as plainly indicated in the drawings.

In operation the hook portions 20 are to be engaged with the upper sides of a stretch of fuse-wire between the ratchet-wheels and the end pieces 29, while the jaw portions 21 will engage against the under sides of the fuse-wire. While in this position the part 23 will be held from rotation by means of its handle or lever 24 engaging with the latch 25. The current will pass through the lead-wires, the contacts, and the stretch of fuse-wire. Should a stretch of fuse-wire be burned out or destroyed, the part 23 is to be rotated by means of its lever or handle 24, which will cause the hook portions 20 to move upward while the jaws 21 move downward. When the hook portions 20 spring into engagement with the next stretch of fuse-wire, the rotary part 23 is to be returned to its normal position, which by drawing the hooks downward will rotate the carrier one step, and the jaws 21 will engage tightly against the under side of the fuse-wire. Obviously this operation may be continued until all of the stretches of fuse-wire shall have been destroyed, when the carrier may be removed, as before described, and provided with a new fuse-wire.

Having now described my invention, I claim as new and desire to secure by Letters Patent—

1. A fuse-carrier, comprising a cylinder mounted to rotate, a plurality of fuse-wires supported in the carrier, separating-plates arranged between adjacent fuse-wires, and contact devices adapted to engage with the fuse-wires and operating to impart a rotary motion to the carrier, substantially as specified.

2. A fuse-holder, comprising a cylinder mounted to rotate, separating-plates arranged radially with relation to the operating portion of the carrier, said plates consisting of insulating material, end pieces consisting of insulating material, a fuse-wire consisting of a single length rove through perforations in said end pieces and having stretches passed between adjacent separating-strips, and means comprising contact devices, for engaging with the fuse-stretches and adapted upon movement to impart a rotary movement to the carrier, substantially as specified.

3. A fuse-carrier, comprising a cylinder mounted to rotate, slate separating-strips extended radially from the body of the cylinder and forming side walls of chambers, slate end pieces engaging with the ends of the strips, ratchet-wheels on the ends of the body portion of the cylinder, a fuse-wire rove through perforations in said ratchet-wheels and also through perforations in the end pieces, the stretches of the wire being extended through the chambers, spring-pawls engaging with the ratchet-wheels, a rocking part, contact devices movable by said rocking part, clamping-jaws having pivotal connection with said rocking part, binding-posts, and contact-plates on said binding-posts adapted for engagement by the contact devices, substantially as specified.

4. A fuse-holder, comprising a casing, a fuse-wire carrier mounted for rotary motion in the casing, the said holder being divided into a series of chambers, fuse-wires extended through the chambers, means for preventing a backward movement of the carrier, a shaft on which the carrier is removably mounted, a lug on said shaft adapted to engage with the carrier so that the carrier will rotate with the shaft, the said lug being adapted to pass through an opening in an end wall of the casing, and contact devices for engaging with the fuse-wires, substantially as specified.

5. A fuse-holder, comprising a rotary carrier, consisting of a body portion provided with a series of longitudinal channels, slate separating-strips adapted to be seated in said channels, slate end pieces engaging with the ends of said strips, fuse-wire stretches passing between adjacent separating-strips, and means comprising contact devices, for imparting rotary motion to the carrier, substantially as specified.

In testimony whereof I have signed my name to this specification in the presence of two subscribing witnesses.

WARREN RANKIN COOK.

Witnesses:
LOUIS COOK,
JAS. J. McVEIGH.